(12) United States Patent
Itwaru (10) Patent No.: US 10,152,716 B2
(45) Date of Patent: Dec. 11, 2018

(54) SECURE ELECTRONIC COMMERCE

(75) Inventor: Mark Itwaru, Toronto (CA)

(73) Assignee: RIAVERA CORP., Toronto (CA)

(*) Notice: Subject to any disclaimer, the term of this patent is extended or adjusted under 35 U.S.C. 154(b) by 450 days.

(21) Appl. No.: 13/089,268

(22) Filed: Apr. 18, 2011

(65) Prior Publication Data

US 2011/0258077 A1    Oct. 20, 2011

Related U.S. Application Data

(63) Continuation of application No. 10/081,265, filed on Feb. 22, 2002, now Pat. No. 7,949,605.

(Continued)

(51) Int. Cl.
*G06Q 20/00* (2012.01)
*G06Q 20/42* (2012.01)
(Continued)

(52) U.S. Cl.
CPC .......... *G06Q 20/425* (2013.01); *G06Q 20/02* (2013.01); *G06Q 20/04* (2013.01); *G06Q 20/10* (2013.01);
(Continued)

(58) Field of Classification Search
None
See application file for complete search history.

(56) References Cited

U.S. PATENT DOCUMENTS 5,729,594 A    3/1998  Klingman
5,778,173 A *  7/1998  Apte ................................. 726/2
(Continued)

FOREIGN PATENT DOCUMENTS

CA        2769235 A1      2/2011
DE   102007059816 A1      6/2009
(Continued)

OTHER PUBLICATIONS

International Search Report and Written Opinion dated Aug. 27, 2012 issued from the Canadian Intellectual Property Office relating to PCT International Patent Application No. PCT/CA2012/000453.

(Continued)

*Primary Examiner* — John W Hayes
*Assistant Examiner* — John M. Winter
(74) *Attorney, Agent, or Firm* — Procopio, Cory, Hargreaves & Savitch LLP (57) ABSTRACT

Secure transactions are achieved over a public network by using a private network to handle the sensitive information of the transaction. When a client requests a product from a vendor server over a public network, the vendor server notifies a facilitation server on the public network. This results in the client receiving a set of computer readable instructions from the facilitation server. The set of instructions provide access instructions to a transaction server system on the private network so that sensitive transaction information is sent to the transaction server system on the private network rather than over the public Internet. Where the sensitive information is credit card information, the transaction server system may obtain authorization for the transaction from a financial institution and then notify the vendor accordingly. Where the sensitive information is the identity of a user of the client, the transaction server may selectively authorize the transaction without the vendor being apprised of the identity of a user of the client. Secure communications may also be achieved by sending sensitive communications over the private network.

10 Claims, 10 Drawing Sheets

Related U.S. Application Data (60) Provisional application No. 60/270,611, filed on Feb. 23, 2001.

(51) Int. Cl.

| | | |
|---|---|---|
| *G06Q 20/02* | (2012.01) | |
| *G06Q 20/04* | (2012.01) | |
| *G06Q 20/10* | (2012.01) | |
| *G06Q 20/12* | (2012.01) | |
| *G06Q 20/38* | (2012.01) | |
| *G06Q 20/40* | (2012.01) | |
| *G06Q 30/06* | (2012.01) | |
| *H04L 29/12* | (2006.01) | |
| *H04L 29/06* | (2006.01) | |
| *H04L 29/08* | (2006.01) | |

(52) U.S. Cl.
CPC ........... *G06Q 20/12* (2013.01); *G06Q 20/382* (2013.01); *G06Q 20/4014* (2013.01); *G06Q 30/0601* (2013.01); *G06Q 30/0613* (2013.01); *H04L 29/12009* (2013.01); *H04L 29/12367* (2013.01); *H04L 29/12377* (2013.01); *H04L 61/2514* (2013.01); *H04L 61/2517* (2013.01); *H04L 63/083* (2013.01); *H04L 63/0838* (2013.01); *H04L 63/18* (2013.01); *H04L 67/14* (2013.01); *H04L 67/34* (2013.01); *H04L 69/329* (2013.01); *H04L 63/0846* (2013.01); *H04L 63/168* (2013.01); *H04L 2463/102* (2013.01)

(56) References Cited

U.S. PATENT DOCUMENTS

| | | | |
|---|---|---|---|
| 5,799,285 | A | 8/1998 | Klingman |
| 5,903,721 | A * | 5/1999 | Sixtus .............................. 726/2 |
| 5,923,735 | A | 7/1999 | Swartz et al. |
| 5,963,915 | A | 10/1999 | Kirsch |
| 5,970,475 | A | 10/1999 | Barnes et al. |
| 5,992,752 | A | 11/1999 | Wilz, Sr. et al. |
| 6,012,144 | A | 1/2000 | Pickett |
| 6,038,589 | A | 3/2000 | Holdsworth |
| 6,058,250 | A | 5/2000 | Harwood et al. |
| 6,078,902 | A | 6/2000 | Schenkler |
| 6,086,618 | A | 7/2000 | Al-Hilali et al. |
| 6,088,683 | A | 7/2000 | Jalili |
| 6,138,146 | A | 10/2000 | Moon et al. |
| 6,233,565 | B1 | 5/2001 | Lewis et al. |
| 6,332,134 | B1 * | 12/2001 | Foster .......................... 705/36 R |
| 6,675,008 | B1 | 1/2004 | Paik et al. |
| 6,704,873 | B1 | 3/2004 | Underwood |
| 6,910,023 | B1 * | 6/2005 | Schibi .................... G06Q 20/04 705/39 |
| 7,379,921 | B1 | 5/2008 | Kiliccote |
| 7,386,516 | B2 * | 6/2008 | Turgeon ............... G06Q 20/027 705/64 |
| 7,387,250 | B2 | 6/2008 | Muni |
| 7,581,257 | B1 * | 8/2009 | O'Hara ........................... 705/75 |
| 8,016,187 | B2 | 9/2011 | Frantz et al. |
| 8,275,699 | B2 | 9/2012 | Shader et al. |
| 2001/0044787 | A1 * | 11/2001 | Shwartz et al. ................ 705/78 |
| 2002/0062281 | A1 | 5/2002 | Singhal |
| 2002/0066039 | A1 | 5/2002 | Dent |
| 2002/0066042 | A1 | 5/2002 | Matsumoto et al. |
| 2002/0069165 | A1 | 6/2002 | O'Neil |
| 2002/0077976 | A1 | 6/2002 | Meyer et al. |
| 2002/0107745 | A1 | 8/2002 | Loeser |
| 2003/0195843 | A1 | 10/2003 | Matsuda et al. |
| 2005/0029358 | A1 | 2/2005 | Mankins |
| 2005/0125301 | A1 | 6/2005 | Muni |
| 2005/0197968 | A1 | 9/2005 | Das et al. |
| 2007/0119917 | A1 | 5/2007 | Tomikawa et al. |
| 2007/0194123 | A1 | 8/2007 | Frantz et al. |
| 2007/0244811 | A1 | 10/2007 | Tumminaro |
| 2007/0255620 | A1 | 11/2007 | Tumminaro et al. |
| 2008/0172314 | A1 | 7/2008 | Hahn-Carlson |
| 2008/0222048 | A1 | 9/2008 | Higgins et al. |
| 2008/0285755 | A1 | 11/2008 | Camus et al. |
| 2008/0313081 | A1 | 12/2008 | Wee |
| 2009/0090783 | A1 | 4/2009 | Killian et al. |
| 2009/0108080 | A1 | 4/2009 | Meyer et al. |
| 2009/0222353 | A1 | 9/2009 | Guest et al. |
| 2009/0240626 | A1 | 9/2009 | Hasson et al. |
| 2009/0254479 | A1 | 10/2009 | Pharris |
| 2009/0254485 | A1 | 10/2009 | Baentsch et al. |
| 2009/0266893 | A1 | 10/2009 | Chen |
| 2010/0138344 | A1 | 6/2010 | Wong et al. |
| 2010/0169223 | A1 | 7/2010 | Yuan |
| 2010/0211506 | A1 | 8/2010 | Chang et al. |
| 2011/0145093 | A1 | 6/2011 | Paradise et al. |
| 2011/0212707 | A1 | 8/2011 | Mahalal |
| 2011/0244920 | A1 | 10/2011 | Coppinger |
| 2011/0251892 | A1 | 10/2011 | Laracey |
| 2012/0030121 | A1 | 2/2012 | Grellier |
| 2012/0066081 | A1 | 3/2012 | Shader et al. |
| 2012/0078751 | A1 | 3/2012 | Macphail et al. |
| 2012/0130889 | A1 | 5/2012 | Lyons et al. |
| 2012/0136797 | A1 | 5/2012 | Coppinger |
| 2012/0290418 | A1 | 11/2012 | Itwaru |

FOREIGN PATENT DOCUMENTS

| | | |
|---|---|---|
| EP | 0765068 A2 | 3/1997 |
| EP | 0813325 A2 | 12/1997 |
| EP | 0926611 A2 | 6/1999 |
| EP | 1921578 A1 | 5/2008 |
| EP | 2073160 A1 | 6/2009 |
| EP | 2088549 A1 | 8/2009 |
| WO | 96/37848 A1 | 11/1996 |
| WO | 9637848 A1 | 11/1996 |
| WO | 01/95591 A1 | 12/2001 |
| WO | 0195591 A1 | 12/2001 |
| WO | 02102133 A2 | 12/2002 |
| WO | 2011112752 A1 | 9/2011 |
| WO | 2011127354 A2 | 10/2011 |
| WO | 2011130422 A2 | 10/2011 |
| WO | 2012111019 A1 | 8/2012 |
| WO | 2012151660 A1 | 11/2012 |
| WO | 2012158506 A1 | 11/2012 |

OTHER PUBLICATIONS

Gao, et al., "A 2D Barcode-Based Mobile Payment System", 2009 Third International Conference on Multimedia and Ubiquitous Engineering, pp. 320-329, Jun. 4-6, 2009.

International Search Report and Written Opinion dated May 24, 2012 issued from the Canadian Intellectual Property Office relating to PCT International Patent Application No. PCT/CA2012/000223.

International Search Report and Written Opinion dated Jul. 30, 2012 issued from the Canadian Intellectual Property Office relating to PCT International Patent Application No. PCT/CA2012/000452.

International Search Report and Written Opinion dated Apr. 15, 2013 issued from the Canadian Intellectual Property Office relating to PCT International Patent Application No. PCT/CA2013/000135.

International Search Report and Written Opinion dated Apr. 29, 2013 issued from the Canadian Intellectual Property Office relating to PCT International Patent Application No. PCT/CA2013/000136.

Ion, et al., "Don't trust POS terminals! Verify in-shop payments with your phone", presented at Pervasive 2008 Sixth International Conference on Persuasive Computing, Sydney Australia, http://www.persuasive2008.org/.

* cited by examiner

SECURE ELECTRONIC COMMERCE

CROSS-REFERENCE TO RELATED APPLICATIONS

This application claims the benefit under 35 U.S.C. § 120 of patent application Ser. No. 10/081,265 filed Feb. 22, 2002 and entitled "SECURE ELECTRONIC COMMERCE," which in turn claims the benefit under § 119(e) of U.S. Provisional Application Ser. No. 60/270,611 filed Feb. 23, 2001 and entitled "SECURE ELECTRONIC COMMERCE," all of which are incorporated herein by reference in their entirety as if set forth in full.

BACKGROUND OF THE INVENTION

This invention relates to enhancement of the security of network transactions.

Electronic commerce over the public Internet has enjoyed significant growth. However, there are concerns over the security of transactional information sent over the public Internet. One approach to address these concerns has been the advent of so-called "secure sites" (which are usually identified by the high level address of "https", where the concluding "s" stands for "secure"). These sites encrypt communications to achieve security over the public Internet. While secure sites do provide a significant measure of security, encrypted data packets sent to and from these sites may be intercepted leading to the possibility that they may be decrypted by sophisticated hackers.

Thus, there remains a need for an approach to electronic commerce which better ensures the security of such commerce.

In some instances, a prospective consumer of electronic data may wish to remain anonymous. An anonymous transaction, by its nature, provides transaction security. Thus, there is also a need for an approach to electronic commerce which provides anonymity.

SUMMARY OF INVENTION

Secure transactions are achieved over a public network by using a private network to handle the sensitive information of the transaction. When a client requests a product from a vendor server over a public network, the vendor server notifies a facilitation server on the public network. This results in the client receiving a set of computer readable instructions from the facilitation server. The set of instructions provide access instructions to a transaction server system on the private network so that sensitive transaction information is sent to the transaction server system on the private network rather than over the public Internet. Secure communications may also be achieved by sending sensitive communications over the private network.

According to one aspect of the invention, there is provided a method for enhancing security of network transactions, comprising: receiving, over a public Internet, information relating to a pending transaction between a vendor server and a client; sending a message addressed to said client over said public Internet with a set of computer readable instructions having transaction-specific information, said set of computer readable instructions comprising access instructions for connecting said client to a transaction server system on a private network such that sensitive information relating to said transaction is directed to said transaction server system.

According to another aspect of the invention, there is provided a method for enhancing security of network purchase transactions, comprising: receiving, over a public Internet, information relating to a pending purchase transaction between a vendor server and a client; sending a message addressed to said client over said public Internet with a set of computer executable instructions for determining resources of said client for connecting to a private network.

According to a further aspect of the invention, there is provided a method for enhancing security of network transactions, comprising: receiving information relating to a pending transaction over a secure link, said information including a transaction identifier, access information for a data product, and a purchase amount; determining an appropriate chargeable telephone number based upon said purchase amount; storing said transaction identifier, said telephone number, and said access information; and returning said transaction identifier and said telephone number over said secure link.

According to another aspect of the invention, there is provided a computer readable medium storing computer-readable instructions which, when read by a client, cause the client to: dial and establish a connection to a specific telephone number over a telephone network; send a transaction-specific identifier over said connection; receive a message over said connection with a universal resource locator (URL) and password; drop said connection; connect to said URL over a public Internet; and display said password.

According to a further aspect of the invention, there is provided an internet service provider having a border gateway protocol table with an entry mapping at least one Internet Protocol address to a port connected to a private network.

Other aspects of the invention will be apparent from the following description in conjunction with the drawings.

DESCRIPTION OF THE DRAWINGS

In the figures which illustrate example embodiments of the invention.

DETAILED DESCRIPTION

Figure 1:
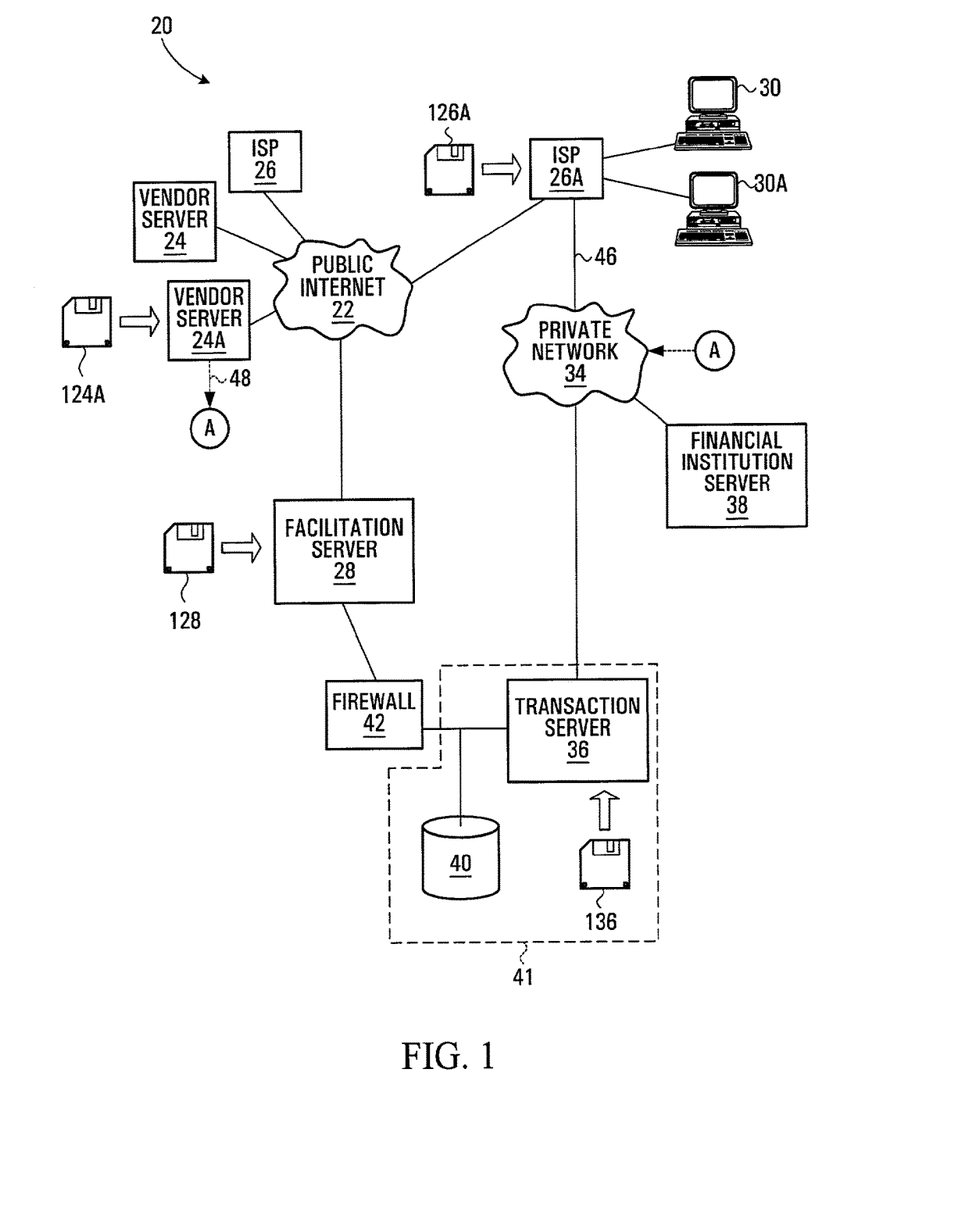
FIG. 1 is a schematic view of a system made in accordance with this invention.

Turning to FIG. 1, a communications system 20 comprises the public Internet 22 to which is connected vendor servers 24, Internet Service Providers (ISPs) 26, and a facilitation web server 28. Each ISP has a number of clients 30 connected to it (either by a dedicated connection or, as is more usual, over a network, such as a telephone network). A transaction server 36 and a financial institution server 38 are connected to private network 34. The transaction server 36 and a database 40 comprise a transaction server system 41 which is connected to the facilitation server 28 through a firewall 42.

An ISP 26a may become a member ISP which can provide for secure transactions in accordance with this invention by being provisioned with a link 46 to private network 34 and with software from computer readable medium 126a. The software adds a mapping from one or more addresses to the port of the ISP 26a connected to link 46. Each of these addresses is in the form of an Internet Protocol (IP) address and is referred to herein as a "private network address".

The mapping from a private network address to a port of the ISP connected to link 46 is accomplished by adding an entry to the Border Gateway Protocol (BGP) table of ISP 26a, which entry is configured as one that cannot be exported. By way of explanation, in Internet Protocol systems, autonomous systems (ASs) exchange network reachability information using BGP. An ISP (which may comprise one or more routers under a single technical administration) is an AS. Each AS maintains a BGP routing table which includes current routes between itself and the ASs to which it connects directly (through a port). (As will be appreciated by those skilled in the art, in some instances, certain ASs with indirect connections to a given AS may also be included in the table.) ASs with direct connections to a given AS are known as the "neighbours" of the given AS. The table entry for a particular neighbouring AS also indicates which network addresses (representing other, non-neighbouring, ASs) are reachable by the particular neighbouring AS. An AS broadcasts an update message when there is a change in its table (except that entries configured as "no export" are not broadcast). When an AS receives data (an IP packet) addressed to a certain IP address, it uses its BGP table to find a neighbouring AS which can reach the destination address and ports the data to that neighbouring AS. Further detail regarding the BGP may be obtained from, for example, RFC 1771 BGP-4, March, 1995, the contents of which are incorporated herein by reference. As detailed hereafter, by adding an entry in the BGP table of the ISP 26a, this invention makes use of the BGP to port messages addressed to a certain network (IP) address (or to one of a group of certain addresses) to the transaction server 36 on a private network. In other words, the BGP table entry references the transaction server 36 on the private network as if it were a neighbouring AS on the public Internet. Transaction server 36 is, however, a cloaked server, meaning it has no public Internet address.

A vendor server 24a may become a member vendor server which can provide for secure transactions in accordance with this invention by being provisioned with software from computer readable medium 124a. The software conditions the operation of the vendor server as is described hereafter and also allots the vendor server a vendor identifier. Additionally, optionally, vendor server 24a is provisioned with a separate link 48 to private network 34.

Facilitation server 28 and transaction server 36 are provisioned with software for operating according to this invention from computer readable medium 128 and 136, respectively. This software includes data for database 40, namely, an identifier (IP address) for each member ISP. Additionally, the data may include the private network address(es) given to each member ISP.

Each of computer readable media 124a, 126a, 128, and 136 may be, for example, a disk, memory chip, or a file downloaded from a remote source.

Figure 1A:
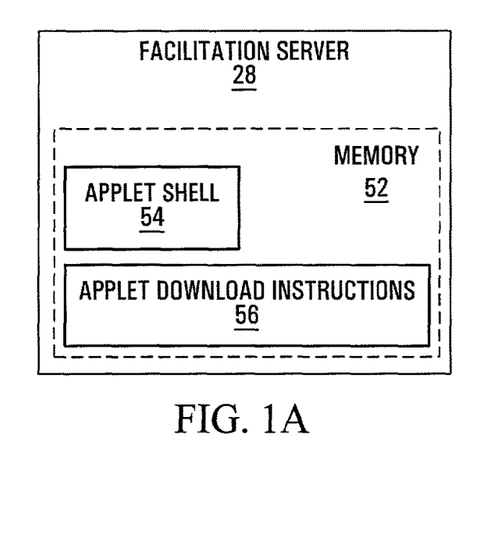
FIG. 1a is a schematic detail view of a portion of the system of FIG. 1.

As shown in FIG. 1a, facilitation server 28 has a memory 52 which stores an applet shell 54 and applet download instructions 56 (set up as a Web page). As will be appreciated by those skilled in the art, an applet (such as a JAVA™ applet) is a small set of computer readable instructions used to perform a small application.

The operation of communications system 20 is described in conjunction with FIGS. 2 to 6 along with FIGS. 1 and 1a.

Figure 2:
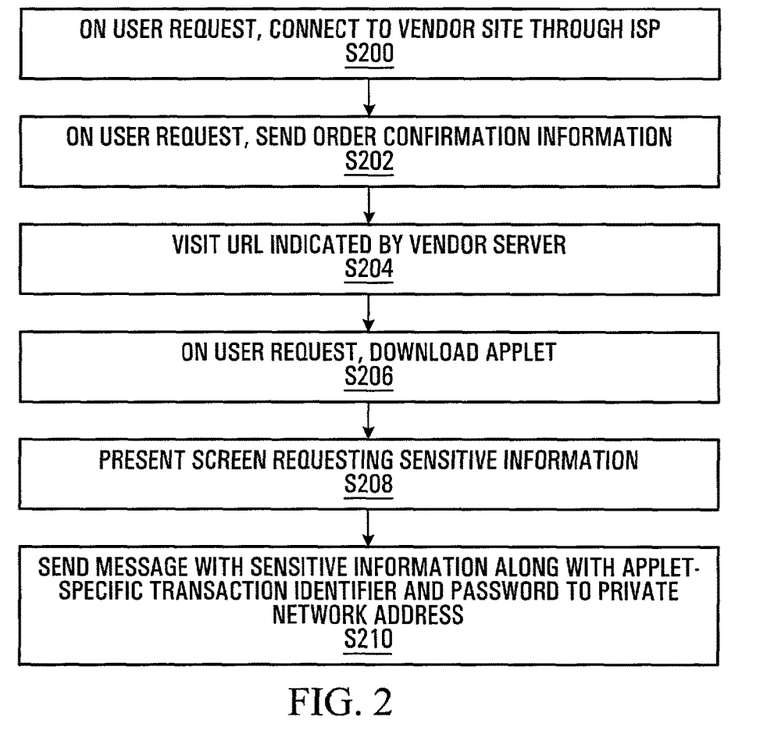
FIG. 2 is a flow diagram illustrating operation of a client of FIG. 1.
Figure 3:
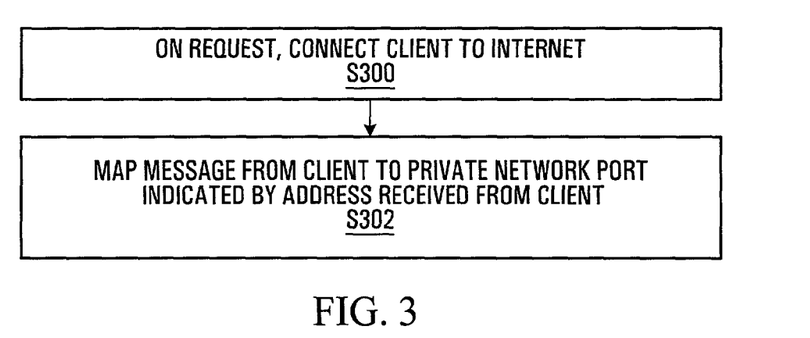
FIG. 3 is a flow diagram illustrating operation of an ISP of FIG. 1.

A client 30a connects to a member vendor web site on member vendor server 24a through member ISP 26a and public Internet 22 in a conventional fashion (FIG. 2, S200; FIG. 3, S300, and FIG. 4, S400). As is conventional, communications between the vendor server and the client use Internet Protocol (IP) data packets. The client may download various pages of the vendor web site which typically allow the user at the client to obtain information about products and select products for purchase. In a common arrangement, when a user at client 30 decides to buy a product from the vendor, he may add a representation of the product to an electronic shopping cart displayed on the vendor web site, provide shipping information, and then confirm the purchase by selecting an order confirmation button displayed on a page of the vendor web site (FIG. 2, S202).

Figure 4:
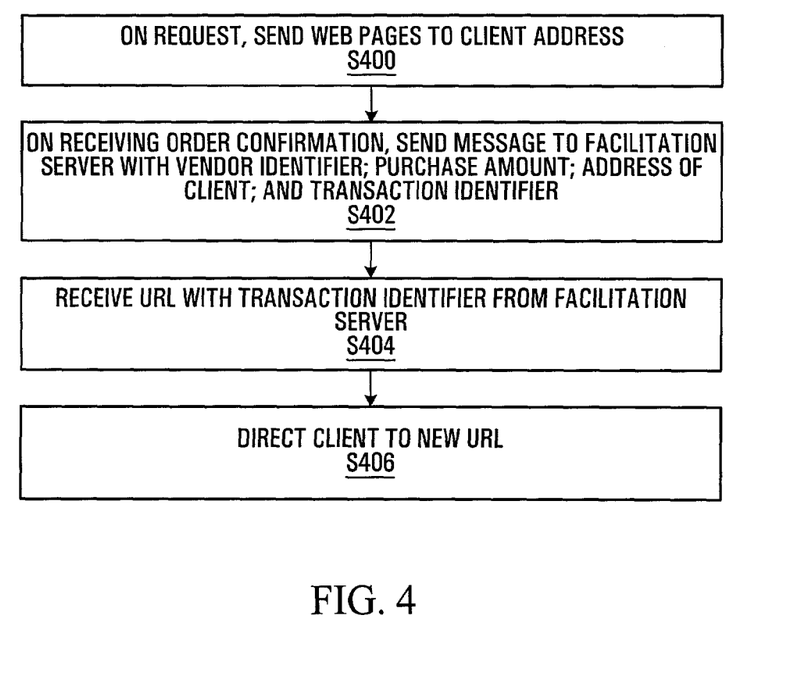
FIG. 4 is a flow diagram illustrating operation of a vendor server of FIG. 1.

Whenever the member vendor server 24a receives an order, it creates a transaction identifier and sends an IP message to facilitation server 28 over public Internet 22. This message includes (1) its pre-registered vendor identifier; (2) the purchase amount; (3) the IP address of the client making the purchase, and (4) the transaction identifier (FIG. 4, S402).

Figure 5:
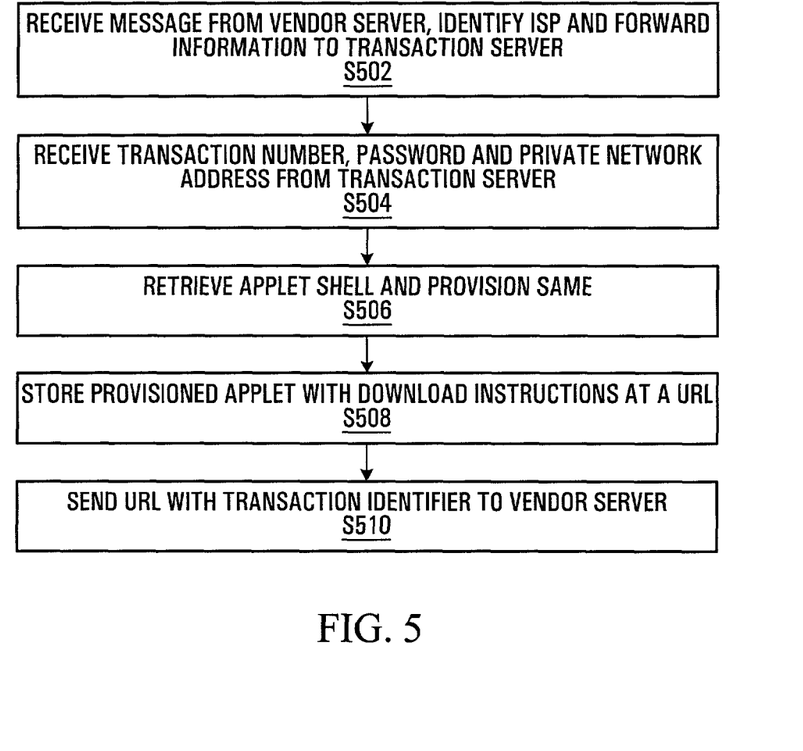
FIG. 5 is a flow diagram illustrating operation of the facilitation server of FIG. 1.

The facilitation server 28 receives the message from the vendor server and identifies the ISP from the client IP address. By way of explanation, as will be appreciated by those skilled in the art, a client IP address is allotted to the client by its ISP from a stable of IP addresses belonging to the ISP. (Each such IP address may either be associated with a specific client or assigned dynamically when the client logs on to the ISP.) The facilitation server 28 can identify the ISP from the client IP address by launching a directory name server (DNS) query over the Internet. The facilitation server then sends the information in the message from the vendor server, along with an identification of the ISP, to the transaction server 36 through firewall 42 (FIG. 5, S502).

Figure 6:
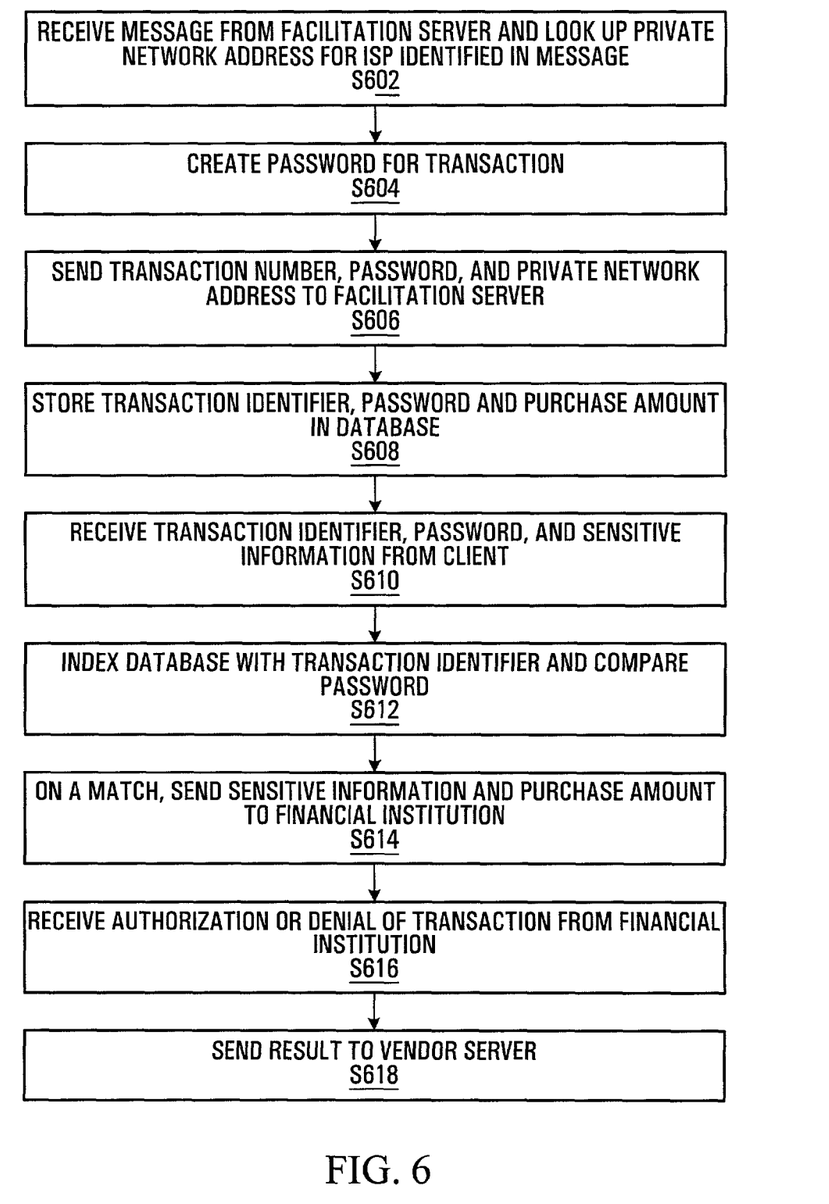
FIG. 6 is a flow diagram illustrating operation of the private network transaction server of FIG. 1.

On receiving the message from the facilitation server, the transaction server uses the address for the ISP 26a as an index into database 40 to determine the private network address associated with the ISP (FIG. 6, S602). Next, the transaction server creates a password for the transaction (FIG. 6, S604). The transaction identifier, password, and the determined private network address, are then returned to the facilitation server 28 via the firewall 42 (FIG. 6, S606). The transaction identifier, password, and purchase amount are also stored in database 40 as a record of the pending transaction (FIG. 6, S608).

On receipt of the message from the transaction server (FIG. 5, S504), the facilitation server retrieves the shell 52 for an applet and provisions the applet shell with the following information: (1) the transaction identifier; (2) the password; (3) the private network address (FIG. 5, S506). The facilitation server then stores the provisioned applet, along with applet download instructions 56 at a specific universal resource locator (URL) (i.e., a World Wide Web address) supported by the facilitation server (FIG. 5, S508). The URL where the applet may be found and the transaction identifier are then directed to the vendor server 24a in a message (FIG. 5, S510).

The vendor server 24a receives the message from the facilitation server and redirects the client to the new URL in the message (FIG. 4, S404, S406). The client 30a visits the new URL (FIG. 2, S204) whereat on screen instructions are provided for downloading the applet. The user at client 30 may follow these instructions to obtain a download of the applet (FIG. 2, S206). The applet then assumes control of the client 30 and presents an interface to the user whereby financial information necessary to complete the purchase of the desired product may be entered (FIG. 2, S208). Typically, the sensitive information comprises a credit card number or a debit card number and a personal identification number (PIN). The applet running on client 30a then sends the sensitive information, along with the transaction identifier and password, to the private network address with which the applet was provisioned via ISP 26a (FIG. 2, S210).

On receipt of the message from the applet, the ISP interrogates its BGP table with the received private network address (which, it will be recalled, is in the style of an IP address) in order to map the message to an output port (FIG. 3, S302). In view of the modification of the ISP's BGP table when it became a member ISP, the private network address is mapped to the port for link 46; this results in the applet message being ported to link 46. Link 46 terminates at transaction server 36; the transaction server thus receives the transaction identifier, password, and sensitive information (FIG. 6, S610). The transaction server uses the transaction identifier as an index to database 40 in order to locate the associated password and purchase amount. If the password retrieved from the database matches that received on link 46 (FIG. 6, S612), the transaction server passes the sensitive information and the purchase amount to a financial institution server competent to authorize the transaction over the private network 34 (FIG. 6, S614). The reply of the financial institution (namely, the approval or disapproval of the transaction) is then passed on to the vendor server 24a with the transaction identifier (FIG. 6, S616). Where the vendor server is provisioned with a direct link 48 to the transaction server 36 over private network 34, the transaction server sends this information directly to the vendor server over this link. Where no such link exists, the transaction server passes this information to the facilitation server which sends the information to the vendor server 24a over the public Internet (FIG. 6, S618).

It will be noted from the foregoing, that a member ISP need only one new entry in its BGP table, as well as a direct link to the private network, in order to operate in accordance with this invention. Further, it will be noted a client need have no permanent software load to take advantage of the invention. It will be apparent that the applet which is downloaded to the client, being provisioned with transaction-specific information, is useful in completing only one transaction. The actions taken by the applet are identified as S208 to S210 in FIG. 2.

In the simplest case, the private network 34 is simply a set of direct end-to-end connections between connected elements. More typically, the private network is, for example, an asynchronous transfer mode (ATM) network. In such instances, a member ISP must be provisioned to handle ATM communications over the private network. Where a vendor server has a link to the private network, it would also need to be similarly provisioned. Such provisioning is believed to be within the skill of those skilled in the art and is, therefore, not further described.

Optionally, database 40 may be part of the transaction server 36.

Optionally, since the vendor server passes the facilitation server the IP address of the client (FIG. 4, S402), the facilitation server could pass the URL for the provisioned applet directly to the client rather than to the vendor server. In such instance, the vendor server could send a message to the client advising the user to trust the message from the facilitation server. The facilitation server could then use conventional digital certificates to prove its identity. As a further option, the facilitation server could simply send a (digitally signed) provisioned applet directly to the client (through the client's ISP) rather than the URL from which the applet may be downloaded.

Optionally, the private network address could be the same for each member ISP. In such instance, it could be a permanent part of an applet shell rather than being looked up by the transaction server.

The transaction identifier is used simply to ensure that data flowing in respect of a given transaction is properly associated with the given transaction. Optionally, the transaction identifier could be created by the transaction server rather than by the vendor server. In such instance, the vendor server may create a temporary transaction identifier which is passed in its message to the facilitation server and which the facilitation server returns when passing the applet URL to the vendor server.

A number of steps may be taken to further enhance the security of the system, as follows. Firstly, a session timer may be activated at the transaction server as soon as sensitive information arrives over the private network. If the transaction server cannot validate the transaction identifier and password within a pre-configured space of time, the connection is dropped. Secondly, the transaction server may have a byte counter such that if the number of bytes arriving from an ISP over the private network exceeds a pre-configured amount, the connection is dropped. An overlong validation process or receipt of too many bytes is suggestive of hacker activity. Thus, these steps reduce the prospects of any such activity causing difficulty. Also, all Internet communications with the facilitation server may be encrypted in a conventional fashion.

Figure 7:
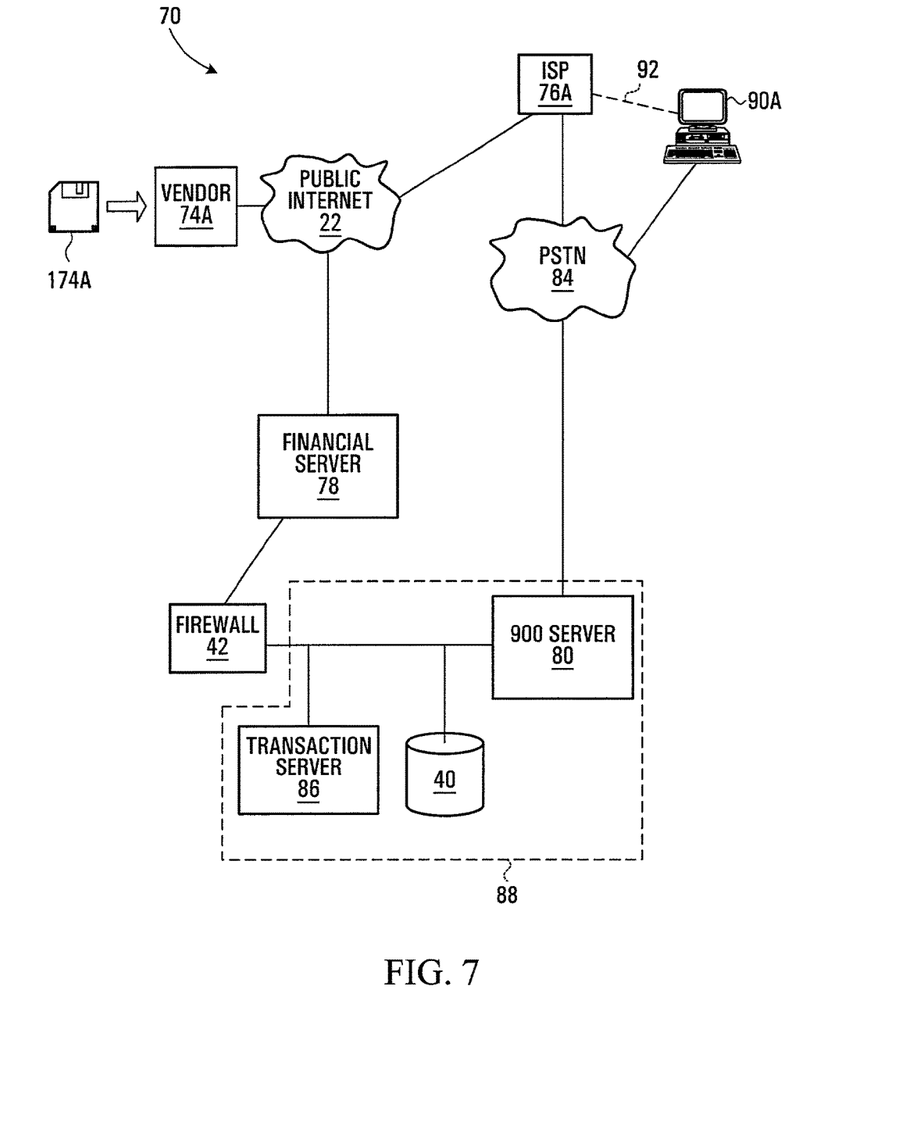
FIG. 7 is a schematic view of a system made in accordance with another embodiment of this invention.

FIG. 7 illustrates another embodiment of the invention which allows for the anonymous purchase of digital data (i.e., the vendor becomes aware of only the internet address of the purchaser). Turning to FIG. 7, wherein like reference numerals have been used to designate like parts, a communications system 70 comprises the public Internet 22 to which is connected vendor server 74a, ISP 76a, and a facilitation server 78. A client 90a has a link to a public switched telephone network (PSTN) 84 over which it may connect to ISP 76a. Alternatively, client 90a may connect to the ISP or over a dedicated Internet connection 92. A "900" server 80 is also linked to PSTN 84. The "900" server, along with a transaction server 86 and a database 40 comprise a transaction server system 88 which is connected to the facilitation server 78 through a firewall 42.

To provide access to a data product for a fee, it is common for a vendor to provide a purchaser with a location (URL) of a restricted site containing the data as well as a necessary username and password to access the site once payment for access to the data has been received. It is assumed that vendor server 74a is configured for this operation.

A vendor server 74a may become a member vendor server which can provide for secure anonymous data purchase transactions in accordance with this invention by being provisioned with software from computer readable medium 174a. The software conditions the operation of the vendor server as is described hereafter and also allots the vendor server a vendor identifier.

To prepare system 70 for operation, a request is made to the operator of PSTN 84 for a series of "900" numbers which will be switched through to "900" server 80. Additionally, a different dollar amount is requested to be associated with each "900" number. As will be understood by those skilled in the art, the "900" service provided by telephone companies (telcos) allow a subscriber to obtain a "900" number such that a caller to the number has a charge associated with the "900" number added to his or her telephone bill by the telco. Database 40 stores the series of "900" numbers along with the different dollar amount associated with each one.

The operation of communications system 70 is described in conjunction with FIGS. 8 to 12 along with FIG. 7.

Figure 8:
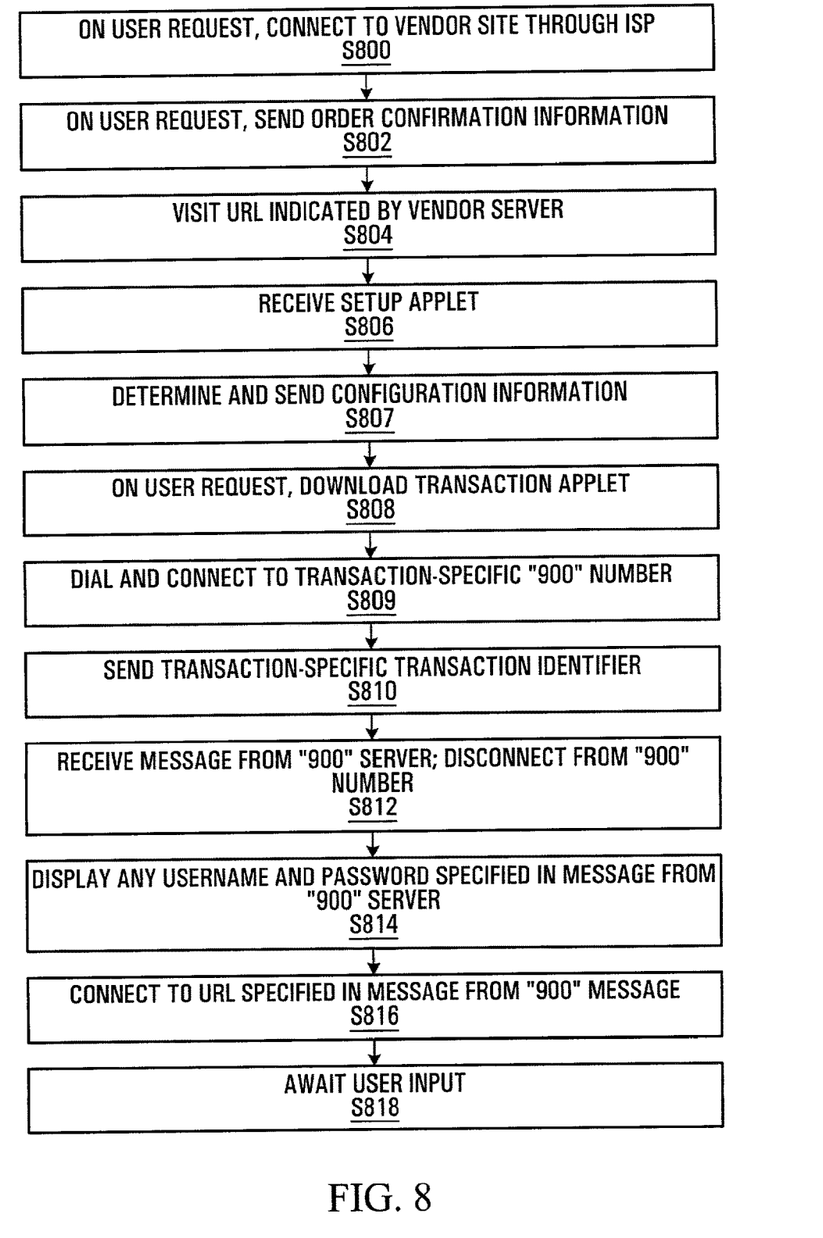
FIG. 8 is a flow diagram illustrating operation of a client of FIG. 7.
Figure 9:
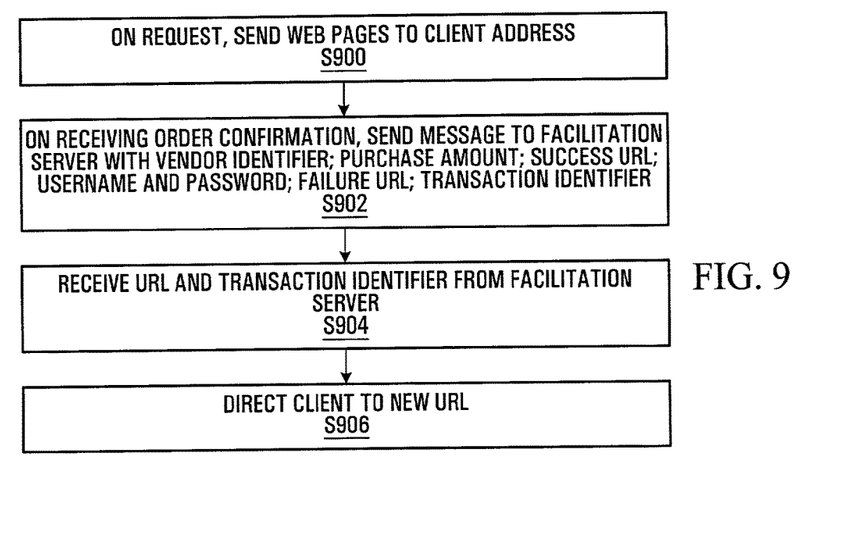
FIG. 9 is a flow diagram illustrating operation of a vendor server of FIG. 7.

Client 90a connects to its ISP 76a and then to a vendor web site on vendor server 74a via the ISP 76a in a conventional fashion (FIG. 8, S800 and FIG. 9, S900). A user at client 90a who decides to buy a data product from the vendor, may add a representation of the data product to an electronic shopping cart displayed on the vendor web site and then confirm the purchase by selecting an order confirmation button displayed on a page of the vendor web site (FIG. 8, S802).

In response to the order, the vendor server 74a creates a transaction identifier and sends the facilitation server 78 a message with (1) its pre-registered vendor identifier; (2) the cost to be charged for the requested data product; (3) the URL of the restricted site to direct the client if the transaction succeeds (the "success URL"); (4) the username and password required for access to the restricted site; (5) the URL to direct the client if the transaction fails (the "failure URL"); and (6) the transaction identifier (FIG. 9, S902).

Figure 10:
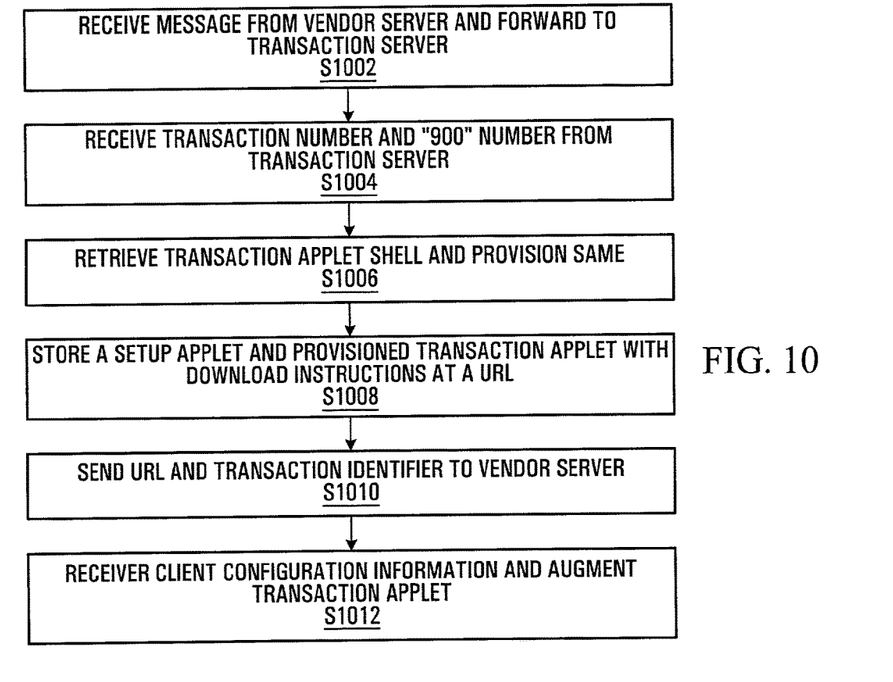
FIG. 10 is a flow diagram illustrating operation of the facilitation server of FIG. 7.
Figure 11:
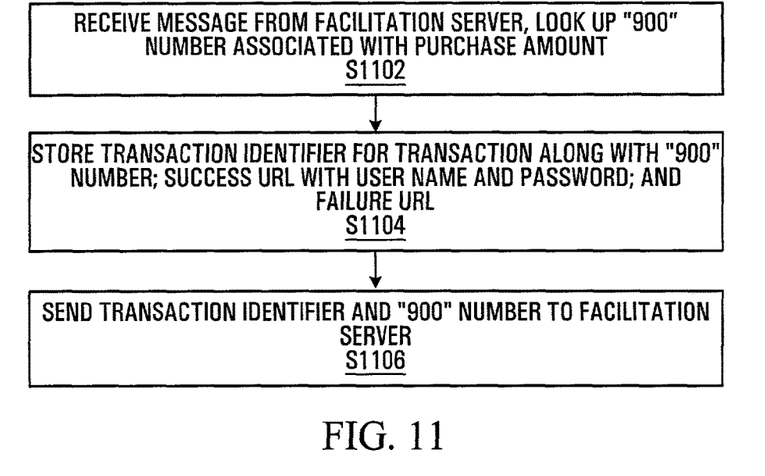
FIG. 11 is a flow diagram illustrating operation of the transaction application server of FIG. 7.

The facilitation server 78 sends this along to transaction server 86 (FIG. 10, S1002). The transaction server accesses database 40 in order to look up a "900" number associated with the received purchase amount (FIG. 11, S1102). The transaction server stores the transaction identifier in database 40 along with the determined "900" number, the success URL (with username and password), and failure URL as a pending transaction record (FIG. 11, S1104). The transaction server 86 then sends a message to the facilitation server with (1) the transaction identifier and (2) the "900" number (FIG. 11, S1106).

In response to receiving the message from the transaction server 86 (FIG. 10, S1004), the facilitation server retrieves a transaction applet shell and provisions this with: (1) the transaction identifier; and (2) the "900" number (FIG. 10, S1006). The facilitation server 78 then stores the provisioned transaction applet at a transaction URL on the facilitation server along with a setup applet and a page of download instructions (FIG. 10, S1008). The facilitation server then passes the transaction URL and transaction identifier to the vendor server (FIG. 10, S1010).

The vendor server 74a redirects the client 90a to the transaction URL (FIG. 9, S904, S906). When the client visits this URL (FIG. 8, S804), the setup applet is downloaded to the client 90a (FIG. 8, S806). The setup applet determines the type of Internet connection that the client makes with the Internet and confirms the client has a modem which can be used to dial over the PSTN (FIG. 8, S807). By way of explanation, the Internet connection could be over the PSTN via a dedicated modem or via a shared modem. Alternatively, the Internet connection could be over a dedicated line. A shared modem may provide an ethernet-based Internet connection, such as digital subscriber loop (DSL) service. A dedicated line could be, for example, a cable line.

Figure 12:
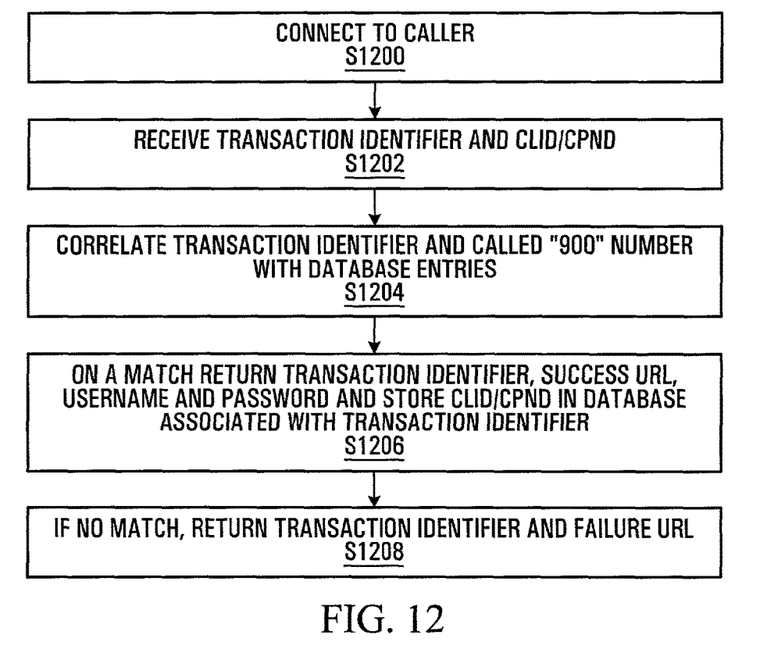
FIG. 12 is a flow diagram illustrating operation of the transaction telephony network server of FIG. 7.

The setup applet passes this configuration information back to the facilitation server and then terminates (FIG. 8, S807). The facilitation server augments the transaction applet based on the type of Internet connection and the page of download instructions invites the client to download the transaction applet (FIG. 10, S1012; FIG. 8, S808). Once the transaction applet is running on the client, if the client is connected to the Internet over a dedicated modem, the transaction applet drops the connection between the client 90a and its ISP 76a over the PSTN and then uses the modem to dial the "900" number which is part of the applet (FIG. 8, S809). On the other hand, given a shared modem, or an Internet connection over a dedicated line in addition to a modem, the transaction applet simply dials the "900" number while the Internet connection subsists. After connecting to the "900" number, the applet passes the transaction identifier to the "900" server 80 (FIG. 8, S810; FIG. 12, S1200, S1202). In this regard, the "900" server may operate in accordance with IP such that the session between the client and "900" server is an IP session.

The "900" server uses the received transaction identifier as an index in to the database (S1204). Assuming that this returns a pending transaction record, the server checks that the called "900" number matches the "900" number in the pending transaction record. If yes, the applet running on the client is passed: (1) the success URL; and (2) a username and password (FIG. 12, S1206).

As is conventional, the call from the client 90a will provide the "900" server with caller line identification (CLID) or calling party name display (CPND) information; this, for an anonymous transaction, is the sensitive information of the transaction. Where the "900" server passes the applet the success URL, the CLID and/or CPND information is stored by the "900" server in database 40 in association with the transaction identifier (FIG. 12, S1206).

On receiving the success URL, the applet disconnects from the "900" server (where necessary, reconnecting the client to the public Internet 22 through its ISP) and directs the web browser of the client 90a to the success URL (FIG. 8, S812, S816). Additionally, the applet displays (in, for example, an on-screen window) the received username and password on screen (FIG. 8, S814). The applet then terminates (FIG. 8, S818) and the user at client 90a is free to enter the supplied username and password in order to obtain the requested data product.

If the transaction identifier passed to the "900" server 80 does not correlate with what is in the database 40, the "900" server returns a failure URL to the applet (FIG. 12, S1208). In this instance, the transaction applet (re-establishes an Internet session, where necessary and) directs the client browser to the failure URL.

From the foregoing, it will be apparent that the operation of the transaction applet is embodied in S809 to S816 of FIG. 8.

Where the setup applet determines (FIG. 8, at S807) that the client does not have a modem, the facilitation server 78 augments the transaction applet (FIG. 10 at S1012) so that it will cause the display of the "900" number, a special code, and the transaction identifier. The transaction applet is also augmented so it will cause the display of user instructions and an input window for a URL, a username and a password. In consequence, after the user downloads the transaction applet (at S808), the transaction applet displays user instructions requesting the user dial the "900" number and enter the code which will indicate to the "900" server that the caller is a human. The transaction applet also displays the transaction identifier. Assuming the user dials the "900" number (S809) and provides the code to the "900" server 80, the server 80 will respond with a request for the transaction identifier. If the user enters this (at S810), the server 80 will respond with a message (S812). This message will include a URL and may also include a username and password. Assuming that the user enters this information into the user input box on his display (S814), the transaction applet then connects to the URL (S816) and operation proceeds as aforedescribed.

From the foregoing, it will be apparent that, in this instance, the operation at S809 to S816 involves actions of the user as well as of the transaction applet.

The charge for the "900" call will appear on the phone bill for the subscriber of the PSTN line from client 90a. The telco forwards the money received in payment of this charge to the operator of the "900" server 80 along with the identity of the customer (i.e., CLID and/or CPND information) who paid this money. The vendor for vendor site 74a bills the operator of the "900" server for the charge for the data which was requested by client 90a and associates the transaction identifier with this bill. The operator of "900" server 80 can correlate the received transaction identifier with the received customer identity information by virtue of having stored the CLID/CPND information in association with the transaction identifier. Thus, the "900" server operator can forward the money to the vendor after receiving it from the telco operator.

It may be noted that, unlike in the embodiment of FIGS. 1 to 6, no password is passed to the client by the applet. In consequence, access to data may be obtained from the transaction server 86 merely with the transaction identifier for a pending transaction, provided the proper "900" number is dialed. This leads to the possibility that a third party (i.e., a person other than the user of client 90a) might obtain access to the data. However, this possibility is not considered problematic because in order to obtain the data, the third party must call in to the 900 server 80 and, in consequence, pay for data. If it was desired to avoid this possibility, then a password could be passed to the transaction applet.

Optionally, a transaction identifier may be generated at the transaction server rather than the vendor server. In such instance, the vendor server passes the facilitation server a temporary transaction identifier which the facilitation server returns with its message to the vendor server containing the URL. Optionally, it may be the transaction server has available to it usernames and passwords for access to the restricted site. In such instance, this information need not be passed to the transaction server from the vendor server.

Optionally, the vendor server could send the facilitation server the client IP address along with the other information sent on receipt of an order confirmation (in S902). This would allow the transaction server to prompt the facilitation server to send an e-mail receipt to the client upon successful completion of a transaction. Also, in such instance, the facilitation server could message the client directly with the URL for the applets. To enhance security, the vendor server could send a message to the client advising the user to trust the message from the facilitation server and the facilitation server could use a digital certificate to prove its identity. As a further option, the facilitation server could simply send (digitally signed) applets directly to the client (through the client's ISP) rather than the URL for the applets.

As a further option, the information sent by the vendor server on receipt of an order confirmation (in S902) could also include a URL to direct the client to if the user aborts the transaction.

Optionally, the transaction server and "900" server could be combined as one server. Also, the database 40 could be part of this combined server.

While the system 70 of FIG. 7 has been described as operating with "900" numbers, obviously any other flat rate telephone numbers could be used. Alternatively, system 70 may be used with bill per minute telephone numbers (i.e., telephone numbers that result in a certain per minute charge over and above any applicable long-distance charges). To operate in this fashion, the transaction server 86 looks up a suitable charge per minute telephone number and then converts the purchase amount of a transaction into an appropriate number of minutes. The telephone number and number of minutes are passed to the facilitation server 78 which, in turn, provisions the transaction applet with this information. In this embodiment, the transaction applet is configured to dial the charge per minute telephone number and hold the line for the indicated number of minutes.

Optionally, the set-up applet and transaction applet could be combined as a single applet. Appendix A sets out pseudo-code for an example JAVA™ combined applet suitable for use with clients running MS-EXPLORER™ under MS-WINDOWS™. Referencing Appendix A, at line 3 a main window of a graphical user interface is created. At lines 4 to 7 an attempt is made to load the transaction-specific parameters which had been stored with the applet (namely the transaction identifier, appropriate "900" number, and possibly a password). If, for whatever reason, the transaction-specific parameters fail to load, then the applet redirects the client's browser to a page of instructions to allow the user to manually dial the "900" number and engage in an interactive voice response (IVR) session with the "900" server in order to attempt to complete the transaction. The same result occurs due to lines 8 to 11 if, for whatever reason, the parameters do not pass a validation process (i.e., they do not make sense). At lines 12 to 15, appropriate security privileges are requested from the client web browser's JAVA™ virtual machine to allow the applet to run native code. If these security privileges are not obtained, again, a page of instructions is presented inviting the user to manually dial the "900" number and engage in an IVR session to attempt to complete the transaction.

Next, at line 16, the applet gets the list of configured modems at the client. In consequence of lines 17 to 22, if there is only one modem, this one is used. Otherwise, the user is queried which modem the applet should use. As a result of lines 23 to 26, if the user fails to select a modem, the IVR session page is presented. Lines 27 to 29 cause a disconnection from the ISP where the user has a dial-up connection without a shared modem. Next, consequent on line 30, the "900" number is dialed to connect the client to the "900" server. If, for whatever reason, the call to the "900" number does not go through, lines 31 to 38 of the applet result in the user being informed of the failure, reconnected to the ISP, and the IVR session page presented. If the call does go through, then, at line 39, the transaction identifier (and password, if any) is passed to the "900" server.

If the transaction fails to validate, then, in consequence of lines 40 to 48, a failure window pops up, the client is disconnected from the "900" server, reconnected to its ISP where necessary, and the client's web browser redirected to a failure URL. On the other hand, as a result of lines 49 to 55, if the transaction does validate, the applet is passed the success URL, username, and password. The applet then loads a receipt page and shows a success pop-up window displaying the username and password. Additionally, the client is disconnected from the "900" server and, if necessary re-connected to its ISP. The client's browser is then redirected to the success URL and, at line 56, the applet exits.

Figure 13:
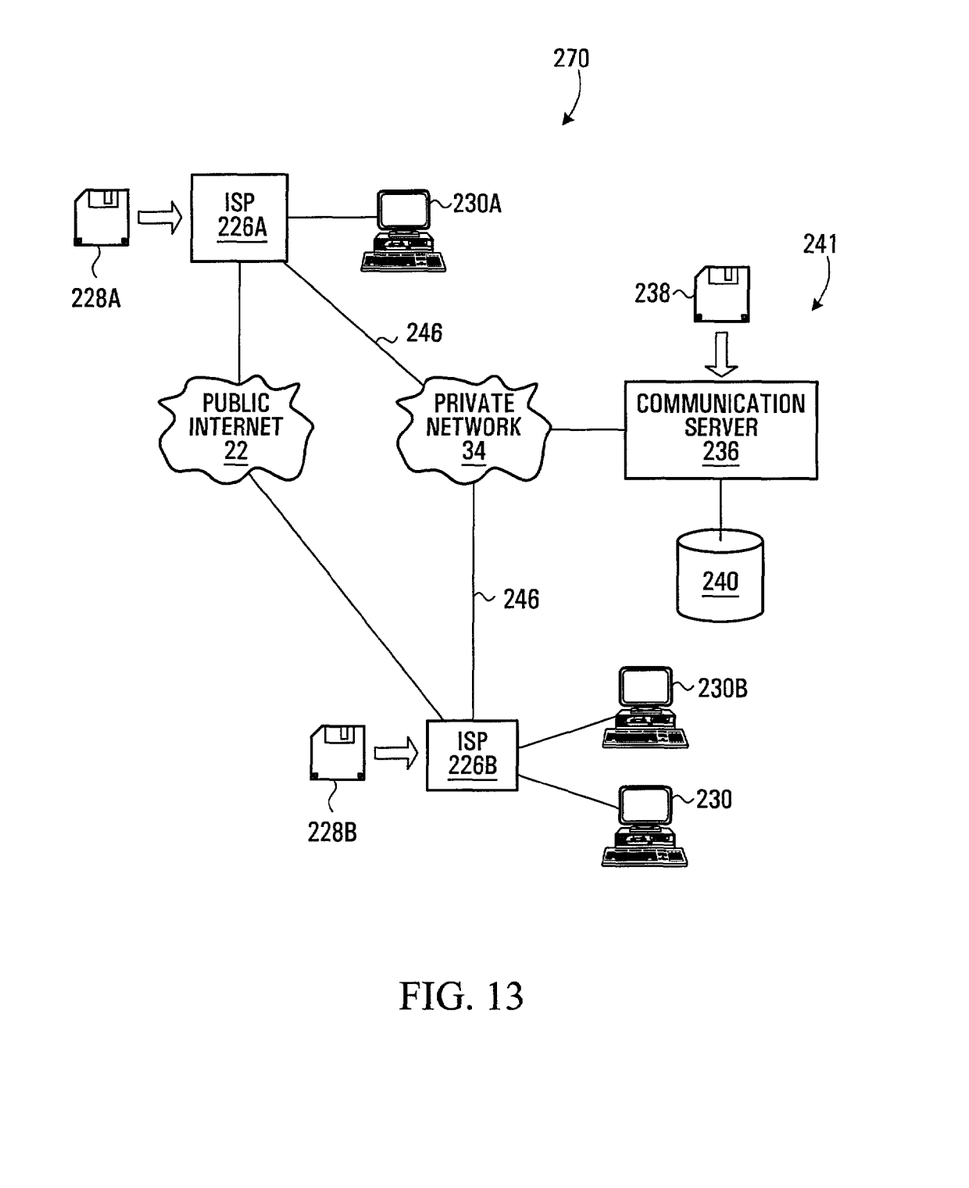
FIG. 13 is a schematic view of a system made in accordance with this invention.

Turning to FIG. 13, a communications system 270 is adapted to provide secure electronic communications. System 270 comprises the public Internet 22 to which is connected ISPs 226a, 226b. Each ISP has a number of clients 230 connected to it (either by a dedicated connection or, as is more usual, over a network, such as a telephone network). A communications server 236 is connected to a private network 34. The communications server and a database 240 comprise a communications server system 241.

An ISP can become a member ISP which can provide for secure communications by being provisioned with a link 246 to private network 34 and with software from a computer readable medium 228a, 228b. The software adds a mapping from one or more addresses, each of which is in the form of an IP address—referred to herein as "private network addresses"—to the port of the ISP connected to line 246. Each of these private network addresses represents a specific other member ISP. As detailed hereafter, by adding an entry in the BGP table of the ISP, this invention makes use of the RGP to port messages addressed to certain network (IP) addresses to the communications server 236 on a private network. In other words, the BGP table entry references the communications server 236 on the private network as if it were a neighbouring AS on the public Internet.

Communications server 236 is provisioned with software for operating according to this invention from computer readable medium 238. This software includes data for database 240, namely, for each member ISP, a mapping of each private network address given to the member ISP to another member ISP.

Each of computer readable media 228a, 228b, 238 may be, for example, a disk, memory chip, or a file downloaded from a remote source.

In operation, client 230a of member ISP 226a may connect to ISP 226a and send a secure e-mail message to a user of client 230b of member ISP 226b, by addressing the message to the user of client 230b at one of the private network addresses allocated for ISP 226b: i.e., the address has the form name@private-network-address. ISP 26a will map the private network address to its port 246 so that the message arrives at the communications server 236 on private network 34. Server 236 indexes the database 240 with the private network address of the message and determines from this the destination ISP 226b. The server 236 then directs the message to the destination ISP over the private network 34. The destination ISP 226b uses the "name" indication of client 230b in the address to direct the message to this client.

Using the described approach, a business with geographically separated offices could arrange for client stations in one office (which connect to the public Internet through one ISP) to securely communicate with client stations in another office (which connect to the public Internet through another ISP).

Other modifications will be apparent to those skilled in the art and, therefore, the invention is defined in the claims.

APPENDIX A

```
ie_main( )
{
    create_gui( );
    if (load_parameters_from_page( ) ==false) {
        redirect_user_to_ivr_page( );
        exit( );
    }
    if (validate_parameters( ) == false) {
        redirect_user_to_ivr_page( );
        exit( );
    }
    if (request_security_access( ) == false) {
        redirect_user_to_ivr_page( );
        exit( );
    }
    modem_list[ ]=get_modem_list( );
    if (count(modem_list[ ])==1) {
        selected_modem=modem_list[0];
    }
    else {
        selected_modem=ask_user_for_modem( );
    }
    if (selected_modem == null) {
        redirect_user_to_ivr_page( );
        exit( );
    }
    if (using_dialup == true) {
        disconnect_from_isp( );
    }
    result=dial_900_server( );
    if (result == fail) {
        show_failure_popup( );
        if (using_dialup ==true) {
            reconnect_to_isp( ):
        }
        redirect_user_to_ivr_page( );
        exit( );
    }
    result=send_tx_details_to_900_server( );
    if (result == fail) {
        show_failure_popup( );
        disconnect_from_900_server( );
        if (using_dialup == true) {
            reconnect_to_isp( ):
        }
        redirect_user_to_failure_page( );
        exit( );
    }
    load_receipt_page( );
    show_success_popup( );
    disconnect_from_900_server( );
    if (using_dialup) {
        reconnect_to_isp( );
    }
    redirect_user_to_success_page( );
    exit( );
}
```

What is claimed is:

1. A non-transitory computer readable storage medium for enhancing network transaction security on a public computer network by updating a table entry used for network transactions between a client computer and a transaction server over a private computer network, the enhancing network transaction security being performed as a result of execution of a set of computer readable instructions stored on the non-transitory computer readable storage medium for execution by a computer processor of a computing system to:

send to a server associated with an internet service provider, by an applet executed by the computer processor, mapping information to cause said server to implement mapping using said mapping information between a private network address and a port of said server connected to a link of said private computer network, said link terminating at said transaction server coupled to said private computer network, said link inaccessible directly by said client computer in transmitting respective sensitive information of the transactions, said mapping information being maintained as the table entry in a border gateway protocol routing table of said server for use in routing the sensitive information when received such that the table entry is non-exportable as a broadcast update message;

receive by the applet over the public computer network an identifier and a purchase amount relating to said transaction;

initiate by the computer processor transmission of said private network address to said client computer;

receive electronically by the computer processor said sensitive information relating to said transaction of said client computer over said private computer network via said server in response to said server implementing said mapping and updating the table entry to reflect said mapping;

process by the computer processor said sensitive information and said purchase amount; and send by the computer processor an approval or disapproval indication relating to said transaction.

2. The non-transitory computer readable storage medium of claim 1 wherein said sensitive information comprises a card number and a personal identification number (PIN).

3. The non-transitory computer readable storage medium of claim 1 comprising providing computer executable instructions for provisioning said client computer to receive said sensitive information from a user of said client computer wherein said computer executable instructions are further for provisioning said client computer to send a transaction identifier with said sensitive information.

4. The non-transitory computer readable storage medium of claim 3 wherein said receive said identifier and said purchase amount relating to said transaction further comprises receiving said transaction identifier with said identifier as a vendor identifier and said purchase amount.

5. The non-transitory computer readable storage medium of claim 4 comprising providing computer executable instructions for provisioning said client computer to receive said sensitive information from a user of said client computer wherein said computer executable instructions are for provisioning said client computer to send a password specific to said transaction with said sensitive information.

6. The non-transitory computer readable storage medium of claim 5 wherein said transaction server stores said transaction identifier in association with said password and said purchase amount and sends said sensitive information and said purchase amount to a financial institution when said password stored by said transaction server matches said password received with said sensitive information.

7. The non-transitory computer readable storage medium of claim 6 wherein said send said approval or disapproval indication relating to said transaction toward said vendor server comprises sending said transaction identifier with said approval or disapproval indication.

8. The non-transitory computer readable storage medium of claim 7 wherein said sensitive information comprises a credit card number and a personal identification number (PIN).

9. The non-transitory computer readable storage medium of claim 7 wherein said sensitive information comprises a debit card number and a personal identification number (PIN).

10. The non-transitory computer readable storage medium of claim 1 comprising providing computer executable instructions for provisioning said client computer to receive said sensitive information from a user of said client computer wherein said providing computer executable instructions comprises providing computer executable instructions on a disk, providing computer executable instructions on a memory chip, or providing a downloadable file.

\* \* \* \* \*